Nov. 9, 1926.

S. B. REDFIELD 1,605,986

REMOVABLE CRANK COUNTERBALANCE

Filed March 31, 1926

INVENTOR
Snowden B. Redfield
BY Herbert G. Ogden
HIS ATTORNEY

Patented Nov. 9, 1926.

1,605,986

UNITED STATES PATENT OFFICE.

SNOWDEN B. REDFIELD, OF EASTON, PENNSYLVANIA, ASSIGNOR TO INGERSOLL-RAND COMPANY, OF JERSEY CITY, NEW JERSEY, A CORPORATION OF NEW JERSEY.

REMOVABLE CRANK COUNTERBALANCE.

Application filed March 31, 1926. Serial No. 98,821.

This invention relates to cranks, but more particularly to the mounting of the connecting rod and counterbalance to a crank shaft.

One object of the invention is to make the counter-balance removable, as may be required or convenient for purposes of assembly of parts of a machine such as a machine using a solid ended connecting rod.

Another object is to facilitate the mounting of a solid ended connecting rod on a crank shaft.

Other objects will be in part obvious and in part pointed out hereinafter.

The invention consists of the combination of elements and arrangement of parts substantially as hereinafter described and more particularly pointed out in the appended claims and illustrated in the accompanying drawings, in which—

Figure 1:
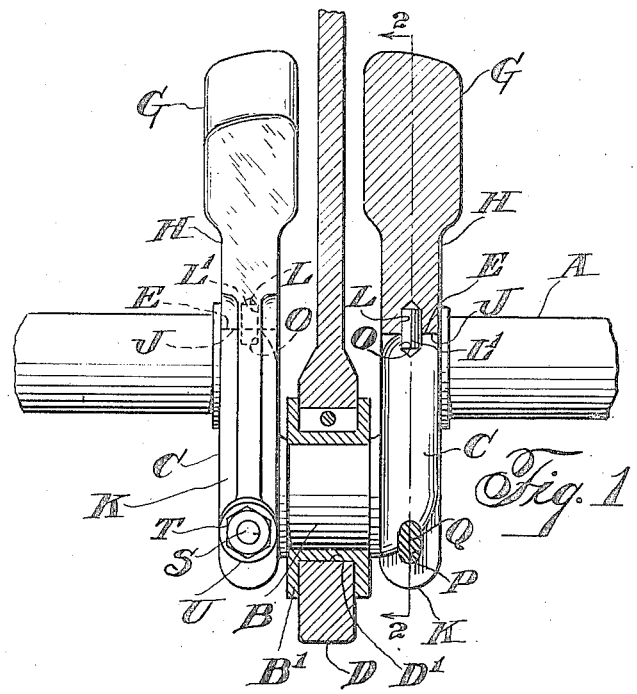
Figure 2:
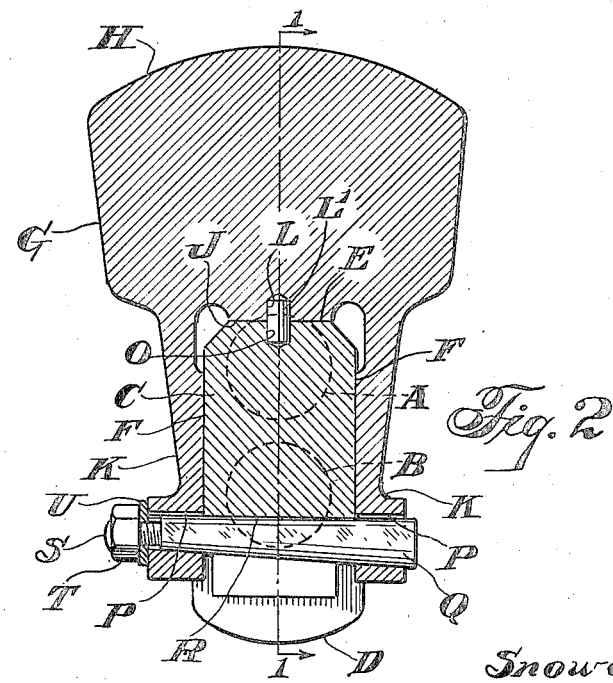

Figure 1 is a longitudinal view of a portion of a crank shaft equipped with counterbalances constructed in accordance with the practice of the invention, and Figure 2 is an elevation in section taken through Figure 1 on the line 2—2 looking in the direction of the arrows.

Referring to the drawings, A designates a crank shaft having a crank pin B connected thereto by the usual crank webs C. A connecting rod D, which may be of any suitable type, is shown operatively connected to the crank pin B. The connecting rod D in this instance is of the solid ended type, that is, the end which cooperates with the crank pin B is provided with a recess D', the walls of which are formed of a single piece. The recess is of sufficient area to permit the connecting rod to pass freely over the various portions of the shaft and to receive crank pin boxes B' which form a bearing for the crank pin.

In accordance with the present invention, the ends E of the crank webs C, or in other words, those ends of the crank webs adjacent the crank shaft A, are machined, as are also the sides F of the crank web to receive counter-balances G. The weight portions H of the counter-balances G may be of any suitable design and are preferably provided with seating surfaces J to cooperate with the ends E of the crank webs to prevent endwise movement of the counterbalances G in one direction on the webs C. The counter-balances G in this instance are provided with extensions K which engage on their inner sides the sides F of the crank webs C. Pins L' inserted in coinciding recesses L and O formed in the counter-balances G and the crank webs C respectively serve to hold the counter-balances against movement in the direction of the longitudinal axis of the crank shaft.

Suitable means are provided for forcing the counter-balances G firmly against the ends E of the crank webs C and also for clamping the extensions K firmly against the sides F of the crank webs. To this end tapered slots P, preferably of oblong cross sectional area as indicated in Figure 1, are formed transversely through the extensions K near the free ends to form seats for tapered keys Q having the general cross sectional form of the slots P. In the present instance only the tapered or lower sides of the keys Q and the slots P are tapered, and the upper or inner sides of the keys Q and the slots P are straight, although the upper or inner sides of the slots and the keys may also be tapered if desired, as may be also the grooves R in the crank webs C against which the intermediate portions of the keys Q rest. The slots P of the extensions K are of such length that when the counter-balances G are clamped firmly in position on the crank webs, the keys Q will rest only on the bottoms of the slots P.

In order to actuate the keys Q in a direction necessary to produce a clamping effect on the extensions K, screws S are formed on the small ends of the keys Q to receive nuts T whereby the keys may be drawn firmly into clamping position. In the present instance washers U are introduced between the nuts T and the extensions K to form a seat for the nuts.

In assembling the device, the pins L' may be inserted in the recesses O of the crank webs and the counter-balances G may then be placed in position on the crank webs. Thereafter the keys Q may be inserted through the slots P and R and the nuts T may then be screwed on the screws S to draw the keys Q firmly into position. It will be seen that when the keys Q are in the proper clamping position, the intermediate portions of the straight sides of said keys will bear against the end walls of the slots R and the tapered sides of the keys Q will engage the tapered sides of the slots P. In this way the keys Q exert a force longitudinally of the crank webs and the counter-balances to force the counter-balances against the ends E of the crank webs and also exert a force transversely of the crank webs and the extensions K to clamp the extensions K firmly against the sides F of the crank webs.

I claim:

1. The combination with a crank shaft having a crank web with an end face, of a removable counter-balance adapted to rest on the end face, extensions on the counter-balance to engage the sides of the crank web, and means cooperating with an end of the crank web and with the extensions for holding the counter-balance on the end face and for clamping the extensions to the sides of the crank web.

2. The combination with a crank shaft having a crank web and with an end face, of a removable counter-balance adapted to rest on the end face, extensions on the counter-balance to engage the sides of the crank web, a tapered key abutting an end of the crank web and extending through the extensions for forcing the counter-balance against the end face and for clamping the extensions against the sides of the crank web, and tightening means for holding the key in position.

3. The combination with a crank shaft having a crank web with an end face, of a removable counter-balance adapted to rest on the end face, extensions on the counter-balance to engage the sides of the crank web, a tapered key abutting the crank web and extending through the extensions, a screw on the small end of said tapered key, and a nut to cooperate with the screw for actuating the tapered key in a longitudinal direction to force the counter-balance against the end face and to clamp the extensions against the sides of the crank web.

4. The combination with a crank shaft having a crank web with an end face, of a removable counter-balance adapted to rest on the end face, extensions on the counter-balance to engage the sides of the crank web, a tapered key seated on an end of the crank web and extending through the extensions, a screw on the small end of said tapered key, a nut to cooperate with the screw for actuating the tapered key in a longitudinal direction to force the counter-balance against the end face and to clamp the extension against the sides of the crank web, and means in the end face to engage the counter-balance for preventing rocking of the counter-balance on the crank web.

In testimony whereof I have signed this specification.

SNOWDEN B. REDFIELD.